United States Patent
Christenson et al.

(10) Patent No.: US 8,060,692 B2
(45) Date of Patent: Nov. 15, 2011

(54) MEMORY CONTROLLER USING TIME-STAGGERED LOCKSTEP SUB-CHANNELS WITH BUFFERED MEMORY

(75) Inventors: Bruce A. Christenson, Forest Grove, OR (US); Rajat Agarwal, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 615 days.

(21) Appl. No.: 12/163,672

(22) Filed: Jun. 27, 2008

(65) Prior Publication Data

US 2009/0327596 A1    Dec. 31, 2009

(51) Int. Cl.
G06F 12/00 (2006.01)
(52) U.S. Cl. .................... 711/105; 711/5; 711/157
(58) Field of Classification Search .................... None
See application file for complete search history.

(56) References Cited

U.S. PATENT DOCUMENTS

| 7,093,059 | B2 | 8/2006 | Christenson |
| 7,644,248 | B2 | 1/2010 | Subashchandrabose et al. |
| 2004/0081005 | A1* | 4/2004 | Garrett et al. ................ 365/200 |
| 2004/0093472 | A1* | 5/2004 | Dahlen et al. ................ 711/158 |
| 2007/0260841 | A1* | 11/2007 | Hampel et al. ............... 711/167 |

OTHER PUBLICATIONS

JEDEC Standard, DDR3 SDRAM Specification, JESD79-3A, Sep. 2007.

* cited by examiner

*Primary Examiner* — Kaushikkumar Patel
(74) *Attorney, Agent, or Firm* — Grossman, Tucker, Perreault & Pfleger, PLLC

(57) ABSTRACT

Memory control techniques for dual channel lockstep configurations are disclosed. In accordance with one example embodiment, a memory controller issues two burst-length 4 DRAM commands to two double-data-rate (DDR) DRAM sub-channels behind a memory buffer (e.g., FB-DIMM or buffer-on-board). The two commands are in time-staggered lockstep. The time-stagger allows data coming back from the two back-side DDR sub-channels to flow naturally on the host channel without conflict. Multiple DIMMs can be used to obtain chip-fail ECC capabilities and to reclaim at least some of the lost performance imposed by the burst-length of 4 s typically associated with dual channel lockstep memory controllers. The techniques can be implemented, for instance, with a buffered memory solution such as fully buffered DIMM (FB-DIMM) or buffer-on-board configurations.

25 Claims, 7 Drawing Sheets

MEMORY CONTROLLER USING TIME-STAGGERED LOCKSTEP SUB-CHANNELS WITH BUFFERED MEMORY

FIELD OF THE DISCLOSURE

The present disclosure relates to memory controllers, and more particularly, to integrated-CPU or chipset-based memory controllers that use buffered memory.

BACKGROUND

As is known, a memory controller manages the flow of data going to and from the memory of a computing system. A memory controller can be implemented on the system's motherboard (e.g. in the northbridge of a northbridge-southbridge configuration), or even directly on the system's CPU die to reduce the memory latency. In any such cases, memory controllers typically include logic for reading and writing dynamic RAM (DRAM), as well as the requisite refresh circuitry.

Memory controllers generally include a number of memory channels. Each channel communicates to DRAM devices installed on dual in-line memory modules (DIMMs). Memory controllers traditionally issue a system cache line request to one channel, using a data burst-length of 8 transfers. Channel width is 8 bytes, resulting in a 64 byte cache line transfer. Alternatively, memory controllers can issue a system cache line request to two channels simultaneously using a data burst-length of 4 (with channel width still at 8 bytes). This transfers 32 bytes per channel, simultaneously, resulting in the 64 bytes cache line. In such dual channel configurations, the channels are said to operate in lockstep.

An advantage of obtaining 64 bytes from 2 lockstep channels is that the payload data resides in twice as many DRAM devices. This allows chip-fail error correction code (ECC) algorithms to be used in the system for a wider variety of DRAM devices. These chip-fail algorithms require transferring payload data from either 16 or 32 DRAM devices, or 18 or 36 devices when including the ECC devices. A disadvantage of lockstep channels is the data burst-length of 4. This incurs a performance penalty for the system, because the data transfer duration on the channel is short compared to bus electrical turnarounds. In addition, new DRAM devices like double-data-rate three (DDR3) are optimized for a burst-length of 8, and incur additional performance penalties when used in burst-length 4 mode.

What is needed, therefore, are memory controllers for dual channel lockstep configurations.

BRIEF DESCRIPTION OF THE DRAWINGS

FIG. 1b illustrates an example embodiment of the memory controller shown in Figure 1a.

DETAILED DESCRIPTION OF THE DISCLOSURE

Figure 1A:
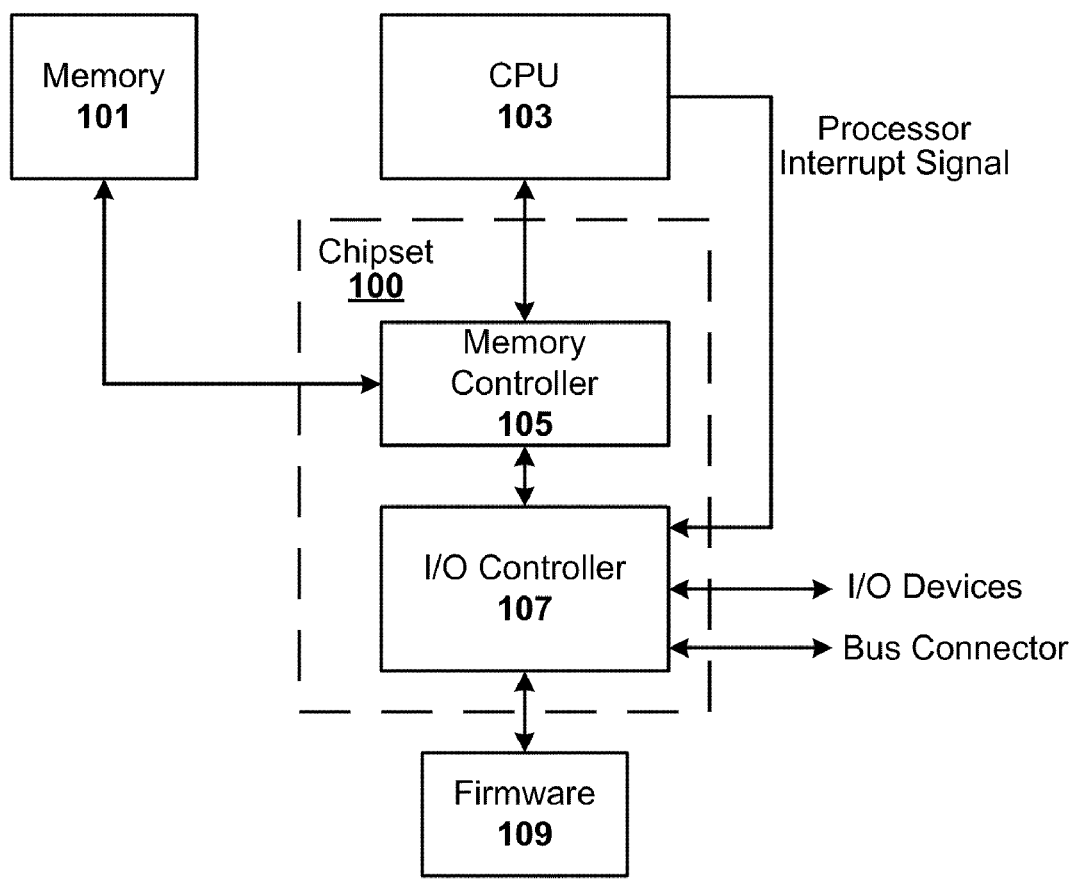
FIG. 1a is a computing system configured in accordance with an embodiment of the present disclosure.

Memory control techniques for dual channel lockstep configurations are disclosed. In one example embodiment, a DRAM sub-channel staggered lockstep configuration is provided, and multiple DIMMs are used to obtain chip-fail ECC capabilities and to reclaim at least some of the lost performance imposed by the burst-length of 4 associated with dual channel lockstep memory controllers. The techniques can be implemented, for instance, with a buffered memory solution such as fully buffered DIMM (FB-DIMM) or other buffer-on-board configurations having an integrated buffer.

General Overview

Embodiments of the present disclosure include a memory controller and memory access methodologies. In accordance with one such embodiment, the memory controller issues two burst-length 4 DRAM commands to two double-data-rate (DDR) DRAM sub-channels behind a memory buffer (e.g., FB-DIMM or buffer-on-board). These commands are sent sequentially by way of a host channel in front of the memory buffer, so that one command is first-in-time and the other command is second-in-time. Thus, the two commands destined for the two buffered DIMMs on the two back-side DDR sub-channels are in time-staggered lockstep. In one specific example, each of the front-side host channel commands and the back-side sub-channels commands are time-staggered by two DDR cycles with respect to each other. The time-stagger allows data coming back from the two back-side DDR sub-channels to flow naturally on the host channel without conflict. Note that the time-stagger of the front-side host channel commands may be the same or different than the time-stagger of the two back-side sub-channel commands, depending on the buffer configuration and intelligence. In addition to just a different stagger, if the buffer is intelligent enough, just a single host command could be used (and forked by the buffer to the back-side sub-channels).

As such, data being written to, or data being read from, the DIMMs logically looks like burst-length 8 transfers being transferred on one logical buffered DRAM channel. In more detail, because the two DRAM sub-channels behind the memory buffer are electrically isolated, read data or write data can be transferred perfectly back-to-back across the two DRAM sub-channels. This is more efficient than issuing back-to-back reads or writes to the same DRAM sub-channel. This is because the time delay associated with back-to-back reads or writes on the same DRAM sub-channel is longer than the time delay associated with time-staggered reads or writes two sub-channels. The time-stagger only needs to be long enough to prevent data conflict on the host channel.

The host channels in front of the memory buffers remain completely independent, and from the host channel point-of-view, it is performing burst-length 8 transfers on a single DRAM sub-channel behind the memory buffer, rather than performing burst-length 4 transfers on two DRAM sub-channels behind the memory buffer. This significantly simplifies the host memory controller to support both independent channel and lockstep channel operation (e.g., depending upon data reliability needs).

Thus, and in one sense, the two time-staggered DRAM sub-channels effectively operate to provide a virtual single DRAM sub-channel with burst-length 8. Such a single sub-channel (at virtual burst-length 8) will not achieve the sub-channel data bus concurrency capability that is possible with traditional burst-length 8 configuration, due to lock-stepping of the sub-channels. However, the single sub-channel (at virtual burst-length 8) is able to achieve much higher throughput than the conventional lockstep burst-length 4 techniques.

The techniques can be implemented, for example, in a standalone configuration (e.g., in the northbridge of a northbridge-southbridge chipset or other such dedicated semiconductor device/topology), or as a CPU-integrated memory controller, to utilize available memory channels more efficiently, particularly when higher levels of reliability are required. Greater memory throughput can be achieved, because the memory controller effectively schedules commands to avoid turnaround penalties associated with the DDR3 DRAM burst-length of 4. This improves both absolute performance and performance per watt of numerous processing platforms (such as those provided by Intel Corporation), while maintaining various capabilities for chip-fail ECC.

The techniques can be employed, for example, by any computing platform component (e.g., CPU, GPU, chipset, embedded processor, etc) with a buffered DRAM-based memory controller or other suitable memory environment, where there are an even number (or pairs) of independent DRAM sub-channels behind one or more buffers. The techniques may be used as the primary mode of memory control, or may be employed as an optional operating mode that can be enabled if so desired.

Architecture

FIG. 1a is a computing system configured in accordance with an embodiment of the present disclosure. As can be seen, the system includes a central processing unit (CPU) or processor 103, a chipset 100 which provides interfaces between processor 103 and various other elements of the system including, for example, memory 101 and firmware 109. The chipset 100 includes memory controller 105 and I/O controller 107. Memory controller 105 interfaces the processor 103 with memory 101. I/O controller 107 interfaces the processor 103 with firmware 109 (e.g., BIOS), as well as with various I/O devices (e.g., serial and parallel ports such as keyboard and mouse, USB, Ethernet, IDE, etc) and bus connectors (e.g., PCI for graphics controller).

The system may be, for example, a personal computer (e.g., mainframe, desktop, laptop, game console, personal digital assistant, or smart phone), or a motherboard or printed circuit card to such a system. In a similar fashion, the system can be implemented as a removable processor board within a multiprocessor computer system, or a single board computer within a multi-slot card chassis having a backplane (e.g., VMEbus chassis). Other components and functionality typically found in computing systems (e.g., operating system and application software, security modules, power conditioning, internal and external bus architectures and inter-process communication mechanisms, etc) are not shown, but will be apparent in light of factors such as the application for which the system is being used and matters of conventional technology.

Processor 103 may be coupled to chipset 100, for example, via a conventional host bus as typically done, as well as by processor interrupt signals. Numerous conventional operative couplings between processor and chipset 100 and interrupt signal schemes can be employed here, and the present disclosure is not intended to be limited to any particular ones. Processor 103 can be any processor appropriate for a computing environment, and in one example embodiment is a microprocessor (e.g., Pentium-based processors from Intel Corporation, or any other suitable such processors). Alternatively, processor 103 may be a microcontroller having a number of I/O ports and various embedded routines, or an Application Specific Integrated Circuit (ASIC) or programmable logic. In any such cases, processor 103 may include several operating modes with varying levels of instructions, architectural features, and protection, depending on desired performance.

In operation, processor 103 may have to access memory 101. In such cases, processor 103 issues memory access requests (e.g., read and write commands), which are processed by memory controller 105 as will be discussed in turn. Memory 101 can be implemented, for example, using any suitable memory devices. In one particular embodiment, memory 101 is implemented with a plurality of fully-buffered DIMMs (e.g., DDR DRAM DIMM, or other such suitable memory). The buffer may be integrated directly into the DIMMs or operatively coupled in front of the memory 101. Numerous buffered memory configurations can be employed in accordance with embodiments of the present disclosure, whether through discrete memory and buffer componentry operatively coupled together, or fully integrated memory with on-board buffer solutions.

The chipset 100 can be implemented, for example, as a northbridge-southbridge architecture, or as an accelerated hub architecture. Other suitable architectures and configurations will be apparent in light of this disclosure. The I/O controller 107 can be implemented as conventionally done, and may be used to operatively couple numerous additional storage facilities (not shown) that can be accessed or otherwise controlled by the memory controller 105.

The memory controller 105 can be configured to carryout conventional memory control operations, as well as memory control operations in accordance with embodiments of the present disclosure, as will be discussed with reference to FIGS. 1b, 2a-b, and 3a-b. As previously indicated, memory controller 105 is capable of receiving memory access requests from processor 103, and then accessing memory 101 accordingly (or other storage facilities by way of I/O controller 107). Such memory control may be in accordance with embodiments of the present disclosure as the sole mode of operation, or as an optional mode that is user-selected or otherwise configurable.

In one such embodiment, the memory control mode is BIOS configurable, where processor 103 is capable of accessing a BIOS configuration stored in firmware 109 (by way of I/O controller 107). Firmware 109 can be implemented as typically done using, for example, flash or other suitable ROM storage (e.g., EPROM, etc). The firmware 109 may include, for example, a menu-driven BIOS programming guide that allows a user to select a virtual burst-length 8 mode (in accordance with an embodiment of the present disclosure), or a conventional burst-length 4 mode, as the mode of operation for the host memory controller 105.

In alternative embodiments, firmware 109 may also be integrated into the chipset 100. In any such cases, the memory 101, processor 103, memory controller 105, I/O controller 107, and firmware 109 may be operatively coupled (e.g., via conventional busses, or other suitable connections) as typically done. In alternative embodiments, the functionality of chipset 100 can be fully-integrated with processor 103, or at least the function of the memory controller 105 portion of chipset 100. Various alternate architectures and integrations of functionality will be apparent in light of this disclosure.

Figure 1B:
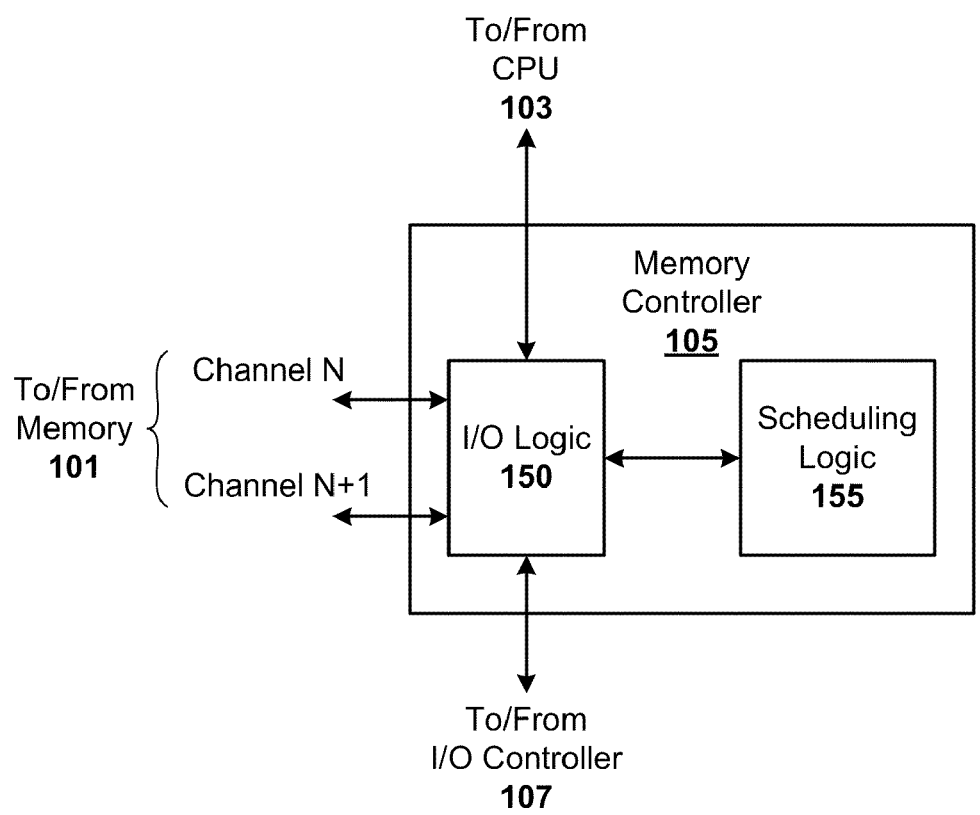

FIG. 1b illustrates an example embodiment of the memory controller 105. The memory controller 105 is capable of operating in a virtual burst-length 8 mode to access memory 101. It may also be configured to operate in other modes, such as a conventional burst-length 4 mode.

As can be seen, the memory controller 105 includes I/O logic 150 and scheduling logic 155. Other logic or circuitry, such as refresh circuitry and column/row select circuitry, may also be included as typically done in conventional memory controllers, but is not shown for purposes of a focused explanation. In addition, and as will be apparent, the logic modules shown as distinct modules for purposes of discussion may readily be combined (along with conventional functionality) into a single logic circuit, for example, by using programmable gate-level logic such as a field programmable gate array (FPGA) or an ASIC or other suitable purpose-built logic.

The I/O logic 150 operates as the primary interface of the controller 105 with other componentry included in the system shown of FIG. 1. For instance, and as can be seen, I/O logic 150 interfaces the controller 105 with each of the memory 101, processor 103, and I/O controller 107, as conventionally done. With reference to carrying out memory access in accordance with an embodiment of the present disclosure, the I/O logic 150 is for receiving memory access requests such as read and write requests from processor 103 or I/O controller 107, or other source. The I/O logic 150 may be configured, for example, to translate or otherwise process the request into a particular format that facilitates processing of the request by scheduling logic 155, as conventionally done. The I/O logic 150 also operatively couples the memory controller 105 to the host channels (Channel N and Channel N+1 in this example embodiment). Various other functionality may be carried out by I/O logic 150 (e.g., for carrying out request acknowledgment, hand-shaking protocols, security protocols, and other such conventional functionality).

In response to the request, the scheduling logic 155 of memory controller 105 generates or otherwise issues commands responsive to the memory request (e.g., based on details included in the memory request, such as target memory location, and type of memory access being requested such as read or write). Examples of such commands include page empty RAS and BL4 CAS commands, although other commands can be used as well, depending on factors such the application-at-hand and the available instruction set. However, instead of sending duplicate commands to separate host channels (Channel N and Channel N+1) as done conventionally, the scheduling logic 155 memory controller 105 sends two duplicate commands to the same host channel (such as sending a pair of CAS commands to Channel N or to Channel N+1) in a time-staggered lockstep fashion.

For instance, and in accordance with one example, the first command of the command pair is issued to host Channel N and one of its sub-channels (e.g., Sub-Channel M), and the second command of the command pair is issued to host Channel N and another of its sub-channels (e.g., Sub-Channel M+1). The scheduling logic 155 issues the command pair such that the two commands are staggered-in-time. In one such embodiment, the delay between the two commands is two DDR cycles. In a more general sense, the delay time can be set so that data coming back from the two back-side DDR sub-channels (data responsive to each of the commands included in the command pair) flow naturally on the appropriate host channel without conflict. In any such cases, the I/O logic 150 receives the time-staggered commands of the command pair issued by the scheduling logic 155, and provides each command (in the established time-staggered fashion) to the appropriate host channel (which is Channel N in this example).

As will be further explained in turn, the time-staggered lockstep commands are received at a buffered memory, which in turn forwards or otherwise processes the commands to the appropriate sub-channels encoded in each command. The scheduling logic 155 may further be configured to carryout other functionality, such as implementing conventional timing constraints imposed on memory access commands by the various applicable standards such as those promulgated by the Joint Electronic Device Engineering Council, also known as JEDEC (e.g., JEDEC Standard, DDR3 SDRAM Specification, JESD79-3A, September 2007). In one such embodiment, scheduling logic 155 is further configured for compensating for induced delay associated with the time-staggered lockstep commands, by reducing other delays that have excess delay built-in. Such functionality will be discussed in more detail with reference to FIGS. 2a-2b and 3a-3c.

After the second command of the command pair is received by the targeted lockstep sub-channel, each of the sub-channels (Sub-Channels M and M+1 in this example) return their data using burst-length of 4 to the memory buffer. As further explained in turn, the memory buffer may be integrated with the memory 101, or may be integrated into the memory controller 105. In any such case, the buffer then returns the two time-staggered lockstep data transfers as one contiguous data transfer back to the I/O logic 150 of the host memory controller 105.

In more detail, and in accordance with this particular example being made with reference to FIG. 1b, the I/O logic 150 receives 32 bytes of data from Sub-Channel M via host Channel N, and another 32 bytes of data from Sub-Channel M+1 via host Channel N, for a total 64 byte data payload from each of the lockstep sub-channels (using burst-length of 4), time-staggered lockstep established by the scheduler logic 155. From the host memory controller 105 perspective, this appears to be a single burst-length of 8 data transfer, even though it is actually two back-to-back burst-length of 4 transfers from the two Sub-Channels M and M+1 behind the memory buffer. The I/O logic 150 can then provide the single burst-length of 8 data transfer to the requesting module, such as processor 103 or I/O controller 107.

The memory controller 105 may implement other functionality, in addition to the virtual burst-length mode described herein. For instance, the memory controller 105 may be configured with a write request queue to store write requests. When a read bank conflict exists between a first read request to a first bank of memory 101 and a second read request to that first bank, a first write request is executed to the second bank of memory 101 during a delay. The delay takes place after the first read request is executed and before the second read request is executed. Such a conflict management scheme efficiently utilizes conflict-induced delay time that is otherwise not exploited. Additional details of one such example management scheme is described in U.S. Pat. No. 7,093,059, titled "Read-Write Switching Method for a Memory Controller."

Alternatively, or in addition to, the memory controller may be configured to schedule read commands to frames via a first dedicated command slot and to schedule write commands and corresponding data to frames via a dedicated second or third command slot. One such scheduling scheme is described in U.S. Patent Application Publication No. 2008/0077761, titled "Mechanism to Generate Logically Dedicated Read and Write Channels in a Memory Controller." As described in one example therein, a scheduler uses slot A for read commands, while using either of slots B and C for write commands. The scheduler includes a read queue, write queue, a read command scheduler and write command scheduler, and three slots (A, B and C).

In any such cases, the memory controller 105 can be implemented, for example, in hardware (e.g., gate-level logic of ASIC), software (e.g., a number of routines encoded on a processor readable medium that, when executed by a processor, carryout the various functionalities described herein), or a combination thereof (e.g., a microcontroller having a number of I/O ports and various embedded routines for carrying out the various functionalities as described herein).

Methodology

Figure 2A:
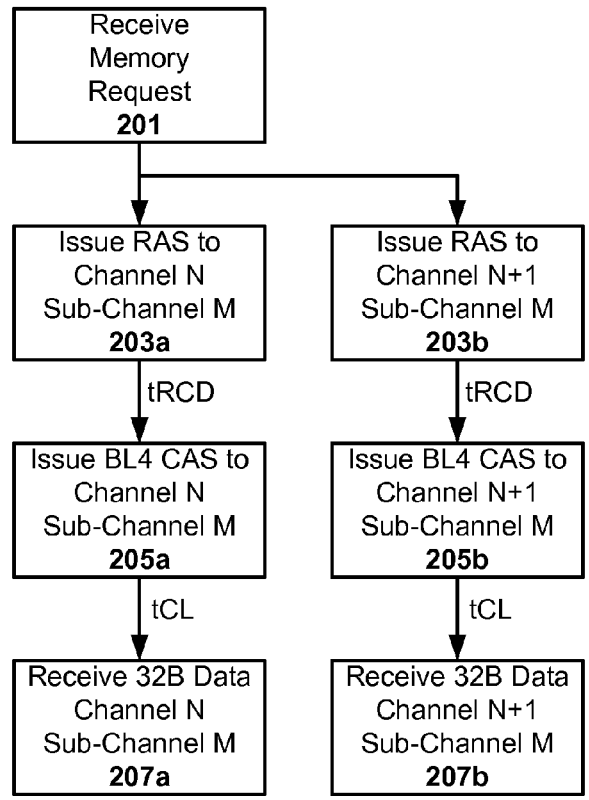
FIGS. 2a and 2b illustrate a conventional lockstep memory access flow.
Figure 2B:
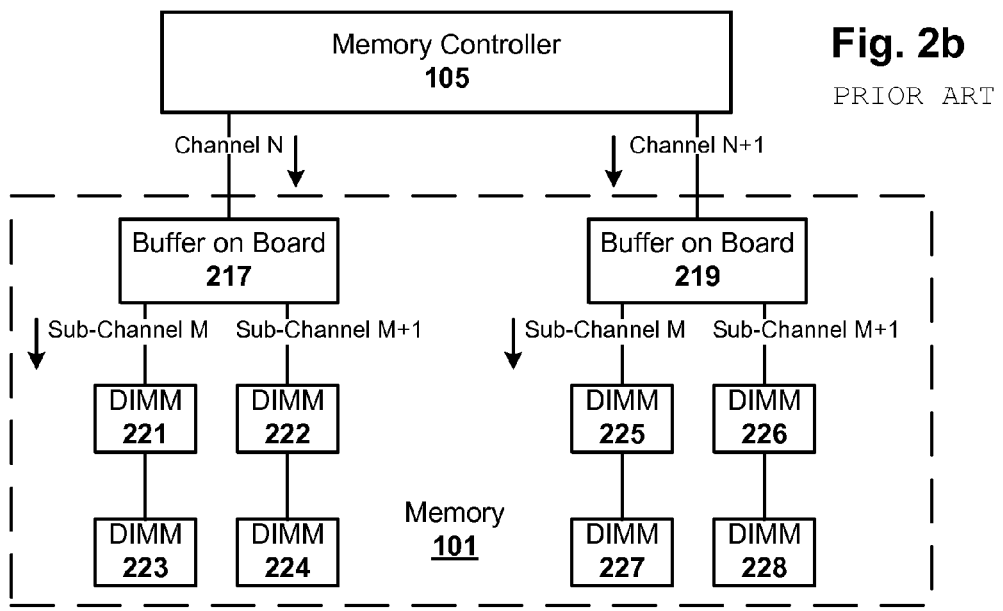

To facilitate explanation of various embodiments of the present disclosure, it will be helpful to first discuss a conventional lockstep memory access flow. To that end, FIGS. 2*a* and 2*b* illustrate a conventional lockstep memory access flow. More specifically, FIG. 2*a* illustrates a flowchart of a typical page empty memory read transaction flow, and FIG. 2*b* indicates which paths in the memory topology of the platform (of FIG. 1) are utilized to carryout the memory transaction.

As can be seen, the conventional flow is carried out by memory controller 105, which is operating in a conventional burst-length 4 mode to access memory 101. In this example, DIMMs 221/223 and 225/227 are accessed for a single lockstep cache line read transaction. Each transaction provides 32 bytes of total payload data, resulting in a 64 byte cache line transfer.

In the example embodiment shown in FIG. 2*b*, memory 101 includes a buffer-on-board architecture, where buffer 217 is in front of DIMMs 221 through 224, and buffer 219 is in front of DIMMs 225 through 228. In more detail, buffer 217 operatively couples host Channel N of controller 105 to Sub-Channel M (DIMMs 221 and 223) and Sub-Channel M+1 (DIMMs 222 and 224). In one such embodiment, memory 101 is implemented with commercially available DDR FB-DIMMs (including any of DDR, DDR2, or DDR3), which include an advanced memory buffer (AMB). In alternative embodiments, the buffers 217 and 219 can be integrated into the memory controller 105. Similarly, the DIMMs can be implemented in the memory controller 105. Further recall that controller 105 can be integrated into processor 103, for a CPU-integrated "on-die" architecture. In any such cases, the controller 105, buffers 217 and 219, and DIMMs 2221-228 operate together to carrying out memory access commands issued by the controller 105.

In operation, and with reference to each of FIGS. 2*a* and 2*b*, a memory request is received (step 201) by the memory controller 105. The request may be generated, for example, by a processor of the host system. Alternatively, the request may be generated remotely and communicated to the controller 105 by a network (e.g., LAN or WAN or combination thereof) or a dedicated line. In short, the request may be delivered to the memory controller 105 in any number of suitable ways.

In response to the request, the memory controller 105 issues the commands and addresses to both of the two lockstep host channels (Channel N and Channel N+1), simultaneously. In this particular example, a page empty memory read transaction is issued by the memory controller 105. Thus, the memory controller 105 issues commands and addresses for a row address strobe (RAS) command to Sub-Channel M via host Channel N at 203*a*, and to Sub-Channel M via host Channel N+1 at 203*b*. In addition, the memory controller 105 issues a burst-length 4 column address strobe (BL4 CAS) command to Sub-Channel M via host Channel N at 205*a*, and to Sub-Channel M via host Channel N+1 at 205*b*. As can be further seen, the RAS and CAS commands are separated by tRCD, which is the RAS-to-CAS delay constraint imposed by the DRAM devices in accordance with known standards (such as the JEDEC standard previously referenced). The RAS and CAS commands are received from host Channel N and Channel N+1 at buffers 217 and 219, respectively. The buffer 217 passes the RAS and CAS commands to DIMMs 221 and 223 via its corresponding Sub-Channel M, and buffer 219 passes the RAS command to DIMMs 221 and 223 via its corresponding Sub-Channel M. As is known, conventional FB-DIMMs and other buffer-on-board memories that can be used to implement buffers 217 and 219 provide a serial point-to-point memory interface for processing memory controller commands.

After the CAS command is received by each of the lockstep channels (accounting for tCL, which is time for CAS latency), data is returned to the host memory controller 105. The controller 105 receives half of the data payload from each of the lockstep channels (using burst-length of 4), simultaneously. In more detail, and with reference to FIGS. 2*a* and 2*b*, controller 105 receives 32 bytes of data from Sub-Channel M via host Channel N at 207*a*, and another 32 bytes of data from Sub-Channel M via host Channel N+1 at 207*b*, for a total 64 byte data payload from each of the lockstep channels (using burst-length of 4), simultaneously.

Figure 3A:
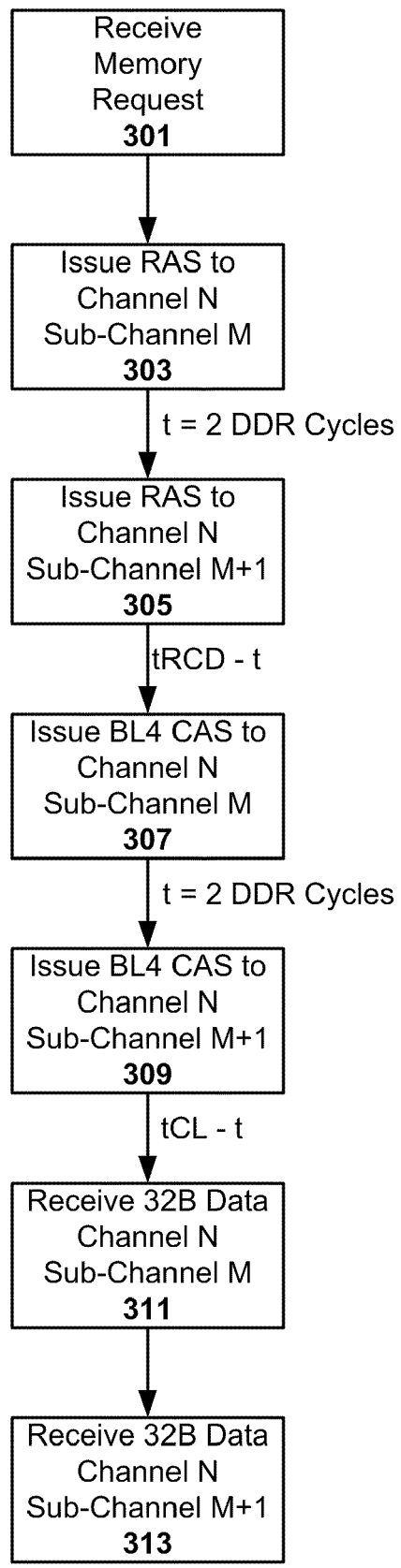
FIGS. 3a and 3b illustrate a lockstep memory access flow configured in accordance with an embodiment of the present disclosure.
Figure 3B:
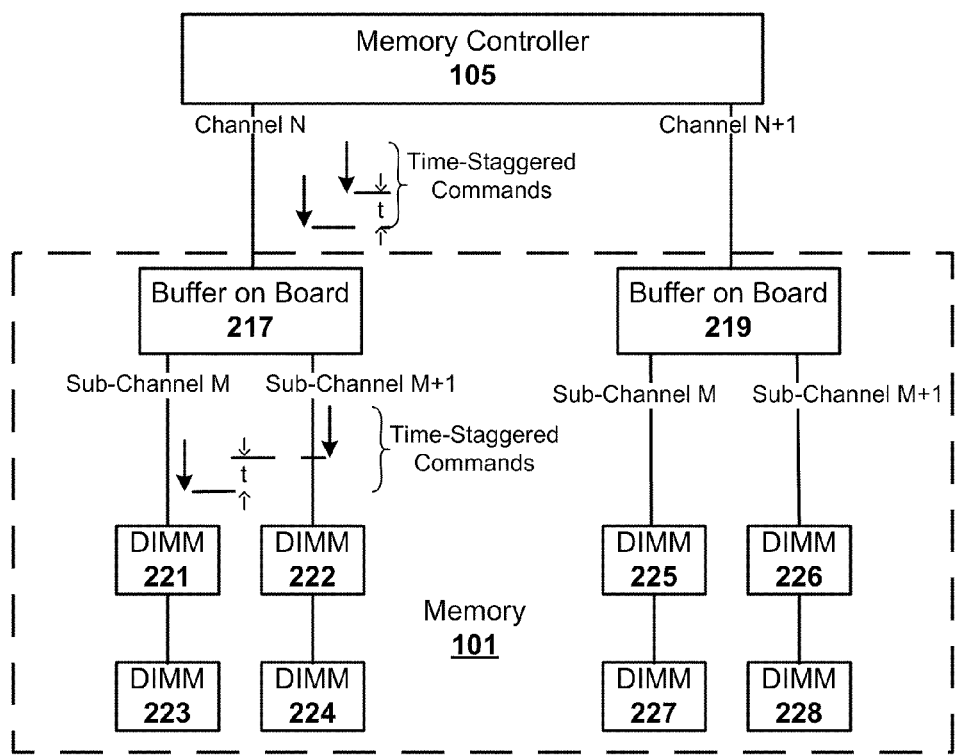

FIGS. 3*a* and 3*b* illustrate a lockstep memory access flow configured in accordance with an embodiment of the present disclosure. In this case, the memory controller 105 is operating in a virtual burst-length 8 mode to access memory 101. In this example, DIMMs 221/223 and 222/224 are accessed for a single lockstep cache line read transaction. Each transaction provides 32 bytes of total payload data, resulting in a 64 byte cache line transfer over a single host channel.

The previous discussion with reference to FIGS. 2*a* and 2*b* regarding buffers 217 and 219 and their integration with memory 101, or with memory controller 105, is equally applicable here. However, this example embodiment takes advantage of the independent DRAM sub-channels behind buffers 217 and 219, to lockstep data across DRAM devices with a different organization so as to provide a virtual burst-length. As previously explained, the buffers 217 and 219 can be implemented, for example, using buffer-on-board or AMBs in an FB-DIMM topology.

In operation, and with reference to each of FIGS. 3*a* and 3*b*, a read request is received (step 301) by the memory controller 105. The request may be generated in any number of suitable ways, as previously discussed. In response to the request, the memory controller 105 issues page empty RAS and BL4 CAS commands on the host Channel N. More specifically, instead of sending duplicate RAS and BL4 CAS commands to separate host channels (Channel N and Channel N+1) as shown in FIGS. 2*a* and 2*b*, the memory controller 105 sends two duplicate RAS commands and two duplicate BL4 CAS commands to the same host channel (Channel N, in this example).

In more detail, and with reference to FIGS. 3*a* and 3*b*, the first RAS command of the RAS command pair is issued at 303 to Channel N and Sub-Channel M, and the second RAS command of the RAS command pair is issued at 305 to Channel N and Sub-Channel M+1. Similarly, the first BL4 CAS command of the CAS command pair is issued at 307 to Channel N and Sub-Channel M, and the second BL4 CAS command of the CAS command pair is issued at 309 to Channel N and Sub-Channel M+1. The time-stagger between the two RAS commands, as well as between the two CAS commands, is time t, which in this example embodiment is two DDR cycles. In a more general sense, time t can be set so that data coming back from the two back-side DDR sub-channels (data responsive to the RAS commands on Channel M, and data responsive to the CAS commands on Channel M+1) flow naturally on the host channel (Channel N) without conflict. As previously explained, the time-stagger of the front-side host channel commands may be the same or different than the time-stagger of the two back-side sub-channels, depending on the buffer configuration and intelligence. For instance, a smart buffer 217 (or 219) may have processing capability, and be configured to determine or otherwise set back-side sub-channel time-stagger based on the command received from front-side host channel.

As can be seen, the RAS and CAS commands are separated by a time of tRCD-t. As previously explained, tRCD is the RAS-to-CAS delay constraint imposed by the DRAM devices and can be set in accordance with various known standards (such as the DDR3 SDRAM JEDEC standard previously referenced) depending on the particular application. By decreasing the RAS-to-CAS delay time tRCD by t, the overall delay that would normally be induced by the time-stagger of t between the two RAS commands is effectively eliminated or otherwise mitigated. As can be further seen, and in a similar fashion, by decreasing the CAS latency time tCL by t, the overall delay that would normally be induced by the time-stagger of t after the two CAS commands is effectively eliminated or otherwise mitigated. In a more general sense, compensating for induced delay associated with the time-staggered lockstep commands can be achieved by reducing other delays that have excess delay built-in (such as the tCL and tRCD delays).

After the second CAS command is received by the lockstep Sub-channel M+1 (accounting for tCL-t, which is time for CAS latency less the induced time-stagger), the Sub-Channels M and M+1 return their data using burst-length of 4 to the buffer 217. The buffer 217 then returns the two staggered data transfers as one contiguous data transfer back to the host memory controller 105. In more detail, and with reference to FIGS. 3a and 3b, controller 105 receives 32 bytes of data from Sub-Channel M via host Channel N at 311, and another 32 bytes of data from Sub-Channel M+1 via host Channel N at 313, for a total 64 byte data payload from each of the lockstep sub-channels (using burst-length of 4), staggered in time t. From the host memory controller 105 perspective, this appears to be a single burst-length of 8 data transfer, even though it is actually two back-to-back burst-length of 4 transfers from the two Sub-Channels M and M+1 behind buffer 217.

Figure 3C:
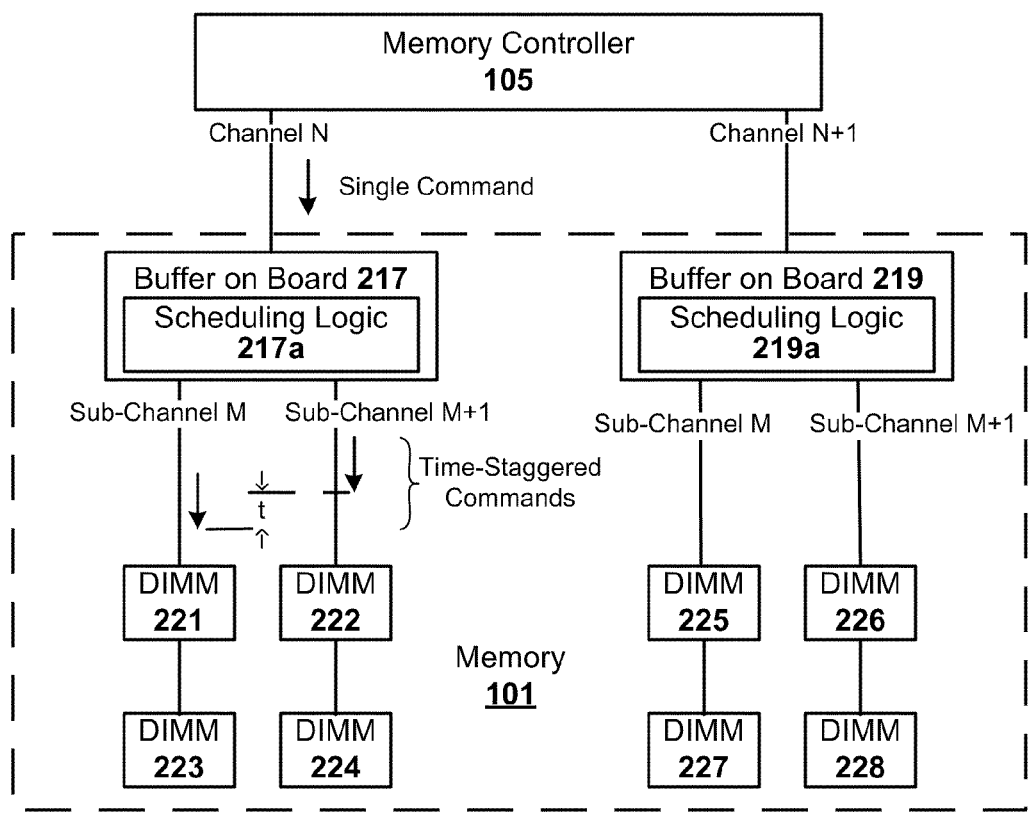
FIG. 3c illustrates a lockstep memory access flow configured in accordance with another embodiment of the present disclosure.

FIG. 3c illustrates a lockstep memory access flow configured in accordance with another embodiment of the present disclosure. The architecture and flow are similar to that described with reference to FIGS. 3a and 3b, except that the buffers 217 and 219 include scheduling logic 217a and 219a, respectively. In such an embodiment, a single host command can be used as opposed to two duplicate time-staggered lockstep host channel commands. This scheduling logic 217a and 219a can perform, for example, similarly to the scheduling logic 155 discussed with reference to FIG. 1b. In one such case, I/O logic 150 is configured to format the request into a single host command, and to pass that single host command to the scheduling logic 217a or 217b. In the particular example shown in FIG. 3c, a single host command is received at the intelligent buffer 217. The scheduling logic 217a operates to duplicate the command, and provides each duplicate command to a corresponding one of the back-side sub-channels (Sub-Channel M and Sub-Channel M+1) in time-staggered lockstep fashion, as previously described. The buffer 217 then returns the two staggered data transfers as one contiguous data transfer back to the host memory controller 105 via the host channel (Channel N). Just as previously explained, from the host memory controller 105 perspective, this appears to be a single burst-length of 8 data transfer, even though it is actually two back-to-back burst-length of 4 transfers from the two Sub-Channels M and M+1 behind buffer 217. The previous discussion with reference to integration of functionality into a single chip or integrated circuit, or on-die, or chip-set, equally applies here. Integrated buffer intelligence may vary from one embodiment to the next. Scheduling logic 217a and 219a is generally referred to herein as buffer logic, and may be configured, for example, for receiving a single command via a single host channel, and for sending the single host command to each of the two different sub-channels in time-staggered lockstep fashion. Such intelligence can be configured into buffers 217 and 219, or shared between distinct memory controller and buffered memory modules, as will be apparent in light of this disclosure.

Performance

Figure 4:
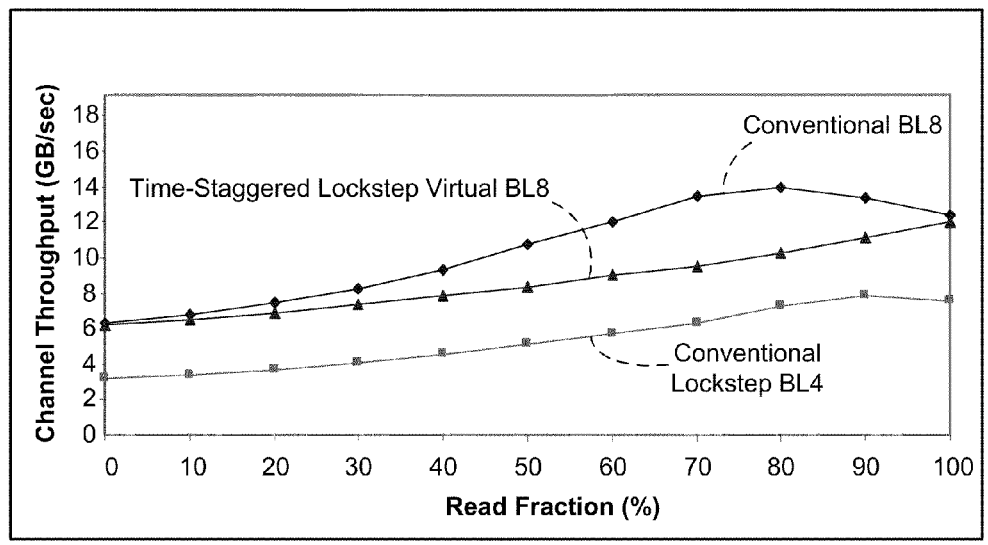
FIG. 4 graphically illustrates a performance comparison of conventional lockstep memory access flows and a lockstep memory access flow in accordance with an embodiment of the present disclosure.

FIG. 4 graphically illustrates a performance comparison of a conventional lockstep burst-length 4 data transfer (square series) as well as a conventional burst-length 8 data transfer (diamond series), with a time-staggered lockstep virtual burst-length 8 data transfer carried out in accordance with an embodiment of the present disclosure (triangle series). As can be seen, the channel throughput (Gigabytes/second) of time-staggered lockstep sub-channels of a single host channel at virtual burst-length of 8 is better than the performance of two sub-channels of different host channels each at a burst-length of 4.

As can be further seen, the sub-channel data bus concurrency capability that is possible with actual burst-length of 8 is not achieved with a virtual burst-length of 8, because the sub-channels are lock-stepped. However, traditional independent channel burst-length 8 techniques may not be adequate for many chip-fail ECC configurations. If a platform must support more advanced chip-fail ECC configurations, it traditionally employs the use of lockstep host channels with a burst-length 4 (as discussed with reference to FIGS. 2a and 2b). This is a low performance configuration, because of both the shorter data transfer duration and the DRAM limitations that make burst-length 4 inefficient.

Thus, a number of embodiments can be implemented in light of this disclosure, including stand-alone memory controllers, or computing systems and processors with integrated memory controller solutions, and related methodologies.

One example embodiment of the present disclosure provides a memory controller device that includes input/output logic for receiving a memory request from at least one memory requesting source, and scheduling logic for issuing two duplicate commands to a single host channel in a time-staggered lockstep fashion, wherein each of the commands is responsive to the memory request and is directed to a different sub-channel associated with the single host channel. The input/output logic is further configured for sending the two time-staggered lockstep commands to a buffered memory using the single host channel. The two time-staggered lockstep commands can each be, for example, burst-length 4 DRAM commands. The buffered memory may include, for example, at least two double-data-rate DRAM sub-channels behind a memory buffer. In one such particular case, the two time-staggered lockstep commands are separated by a delay of two DDR cycles. In a more general sense, the two time-staggered lockstep commands are separated by a delay of sufficient length, so that data provided by the buffered memory that is responsive to each of the two time-staggered lockstep commands flow on the single host channel without conflict. The at least one memory requesting source may be, for example, a processor of a computing system, and the memory request can be, for instance, one of a read or write request. The device may include logic for receiving data provided by the buffered memory that is responsive to each of the two time-staggered lockstep commands, and may further include logic for providing that data to the at least one memory requesting source. In one such case, the logic for receiving data provided by the buffered memory is further configured for receiving two time-staggered lockstep burst-length of 4 data transfers as one contiguous data transfer back, thereby providing a virtual burst-length of 8 data transfer that is responsive to the two time-staggered lockstep commands. The device may include logic for compensating for induced delay associated with the time-staggered lockstep commands by reducing other delays that have excess delay built-in.

Another example embodiment of the present disclosure provides a computing system, which includes a processor for issuing memory requests, a buffered memory for storing data and having at least two sub-channels behind a buffer, and a memory controller. The memory controller can be configured as variously described herein.

Another example embodiment of the present disclosure provides a method for accessing memory. The method includes receiving a memory request from at least one memory requesting source, and issuing two duplicate commands to a single host channel in a time-staggered lockstep fashion, wherein each of the commands is responsive to the memory request and is directed to a different sub-channel associated with the single host channel. The method continues with sending the two time-staggered lockstep commands to a buffered memory using the single host channel. The two time-staggered lockstep commands are separated by a delay of sufficient length, so that data provided in response to each of the two time-staggered lockstep commands flow on the single host channel without conflict. In one particular case, the two time-staggered lockstep commands are each burst-length 4 DRAM commands, and the buffered memory includes at least two double-data-rate DRAM sub-channels behind a memory buffer, and the two time-staggered lockstep commands are separated by a delay of two DDR cycles. The method may include compensating for induced delay associated with the time-staggered lockstep commands by reducing other delays that have excess delay built-in. The method may include receiving data provided by the buffered memory that is responsive to each of the two time-staggered lockstep commands, and may further include providing that data to the at least one memory requesting source. In one such case, receiving data provided by the buffered memory includes receiving two time-staggered lockstep burst-length of 4 data transfers as one contiguous data transfer, thereby providing a virtual burst-length of 8 data transfer that is responsive to the two time-staggered lockstep commands.

Another example embodiment of the present disclosure provides a memory controller system. This example system includes buffer logic for receiving a single command via a single host channel operatively coupled to a front-side of the buffer logic, wherein the single host command is responsive to a memory request received from a memory requesting device. The buffer logic is further configured for sending the single host command to each of two different sub-channels operatively coupled to a back-side of the buffer logic, in time-staggered lockstep fashion. The system further includes at least one memory device associated with each sub-channel. The two time-staggered lockstep commands are separated by a delay of sufficient length, so that data provided by the memory devices that is responsive to each of the two time-staggered lockstep commands flow on the single host channel without conflict. In one such case, the two time-staggered lockstep commands are each burst-length 4 DRAM commands. In another such case, the sub-channels are double-data-rate DRAM sub-channels. In another such case, the two time-staggered lockstep commands are separated by a delay of two DDR cycles. In another such case, the buffer logic is further configured for returning the data as two time-staggered lockstep burst-length of 4 data transfers, thereby providing a virtual burst-length of 8 data transfer that is responsive to the single host command.

The foregoing description of the embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

What is claimed is:

1. A memory controller device comprising at least one of hardware and machine-executable instructions stored in memory or firmware, the memory controller device further comprising:
    input/output logic for receiving a memory request from at least one memory requesting source; and
    scheduling logic for issuing two duplicate commands to a single host channel in a time-staggered lockstep fashion, wherein each of the two duplicate commands is responsive to the memory request and is directed to a different sub-channel associated with the single host channel;
    wherein the input/output logic is further configured for sending the two duplicate commands to a buffered memory using the single host channel.

2. The memory controller device of claim 1 wherein the two duplicate commands are each burst-length 4 dynamic random access memory (DRAM) commands.

3. The device of claim 1 wherein the buffered memory includes at least two double-data-rate dynamic random access memory (DRAM) sub-channels behind a memory buffer.

4. The memory controller device of claim 3 wherein the two duplicate commands are separated by a delay of two double-data-rate (DDR) cycles.

5. The memory controller device of claim 1 wherein the two duplicate commands are separated by a delay of sufficient length, so that data provided by the buffered memory that is responsive to each of the two duplicate commands flow on the single host channel without conflict.

6. The memory controller device of claim 1 wherein the at least one memory requesting source includes a processor of a computing system, and the memory request is one of a read or write request.

7. The memory controller device of claim 1 further comprising:
    logic for receiving data provided by the buffered memory that is responsive to each of the two duplicate commands; and
    logic for providing the data provided by the buffered memory to the at least one memory requesting source.

8. The memory controller device of claim 7 wherein the logic for receiving data provided by the buffered memory is further configured for receiving two time-staggered lockstep burst-length of 4 data transfers as one contiguous data transfer back, thereby providing a virtual burst-length of 8 data transfer that is responsive to the two time-staggered lockstep commands.

9. The memory controller device of claim 1 further comprising:

logic for compensating for induced delay associated with the two duplicate commands by reducing other delays that have excess delay built-in.

10. A computing system, comprising:
a processor for issuing memory requests;
a buffered memory having at least two sub-channels behind a buffer, and for storing data; and
a memory controller comprising:
   input/output logic for receiving a memory request from the processor; and
   scheduling logic for issuing two duplicate commands to a single host channel in a time-staggered lockstep fashion, wherein each of the two duplicate commands is responsive to the memory request and is directed to a different one of the sub-channels;
   wherein the input/output logic is further configured for sending the two duplicate commands to the buffered memory using the single host channel;
   wherein the two duplicate commands are separated by a delay of sufficient length, so that data provided by the buffered memory that is responsive to each of the two duplicate commands flow on the single host channel without conflict.

11. The system of claim 10 wherein the two duplicate commands are each burst-length 4 dynamic random access memory (DRAM) commands.

12. The system of claim 10 wherein the buffered memory includes at least two double-data-rate dynamic random access memory (DRAM) sub-channels behind a memory buffer.

13. The system of claim 12 wherein the two time-staggered lockstep commands are separated by a delay of two double-data-rate (DDR) cycles.

14. The system of claim 10 wherein the memory controller further comprises:
logic for receiving data provided by the buffered memory that is responsive to each of the two duplicate commands; and
logic for providing the data provided by the buffered memory to the processor.

15. The system of claim 10 wherein the buffered memory is further configured for returning two time-staggered lockstep burst-length of 4 data transfers as one contiguous data transfer back to the input/output logic, thereby providing a virtual burst-length of 8 data transfer that is responsive to the two duplicate commands.

16. A method for accessing memory, comprising:
receiving a memory request from at least one memory requesting source;
issuing two duplicate commands to a single host channel in a time-staggered lockstep fashion, wherein each of the two duplicate commands is responsive to the memory request and is directed to a different sub-channel associated with the single host channel; and
sending the two duplicate commands to a buffered memory using the single host channel;
wherein the two duplicate commands are separated by a delay of sufficient length, so that data provided in response to each of the two duplicate commands flow on the single host channel without conflict.

17. The method of claim 16 wherein the two duplicate commands are each burst-length 4 dynamic random access memory (DRAM) commands, and the buffered memory includes at least two double-data-rate (DDR) dynamic random access memory (DRAM) sub-channels behind a memory buffer, and the two time-staggered lockstep commands are separated by a delay of two double-data-rate (DDR) cycles.

18. The method of claim 16 further comprising:
compensating for induced delay associated with the two duplicate commands by reducing other delays that have excess delay built-in.

19. The method of claim 16 further comprising:
receiving data provided by the buffered memory that is responsive to each of the two duplicate commands; and
providing the data provided by the buffered memory to the at least one memory requesting source.

20. The method of claim 19 wherein receiving data provided by the buffered memory further comprises receiving two time-staggered lockstep burst-length of 4 data transfers as one contiguous data transfer, thereby providing a virtual burst-length of 8 data transfer that is responsive to the two duplicate commands.

21. A memory controller system comprising at least one of hardware and machine-executable instructions stored in memory or firmware, the memory controller system further comprising:
buffer logic for receiving a single host command via a single host channel operatively coupled to a front-side of the buffer logic, wherein the single host command is responsive to a memory request received from a memory requesting device, the buffer logic being further configured to duplicate the single host command into a first host command and a second host command, and to send the first host command and second host command to each of two different sub-channels operatively coupled to a back-side of the buffer logic, in time-staggered lockstep fashion;
at least one memory device associated with each sub-channel, the at least one memory device being responsive to each of the first host command and second host command;
wherein the first host command and second host command are separated by a delay of sufficient length, so that data provided by the at least one memory device flows on the single host channel without conflict.

22. The system of claim 21 wherein the first host command and second host command are each burst-length 4 dynamic random access memory (DRAM) commands.

23. The system of claim 21 wherein the sub-channels are double-data-rate dynamic random access memory (DRAM) sub-channels.

24. The system of claim 12 wherein the first host command and second host command are separated by a delay of two double-data-rate (DDR) cycles.

25. The system of claim 21 wherein the buffer logic is further configured for returning the data provided by the at least one memory device as two time-staggered lockstep burst-length of 4 data transfers, thereby providing a virtual burst-length of 8 data transfer that is responsive to the single host command.

* * * * *